US009386040B2

(12) United States Patent
Hu

(10) Patent No.: US 9,386,040 B2
(45) Date of Patent: *Jul. 5, 2016

(54) POLICY-BASED SERVICE MANAGEMENT SYSTEM

(71) Applicant: AT&T Mobility II LLC, Atlanta, GA (US)

(72) Inventor: Qingmin Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/151,016

(22) Filed: Jan. 9, 2014

(65) Prior Publication Data

US 2014/0123219 A1    May 1, 2014

Related U.S. Application Data

(63) Continuation of application No. 12/649,956, filed on Dec. 30, 2009, now Pat. No. 8,659,997, which is a continuation of application No. 11/513,100, filed on Aug. 29, 2006, now Pat. No. 7,664,022.

(51) Int. Cl.
*H04L 29/06* (2006.01)
*H04L 12/24* (2006.01)

(52) U.S. Cl.
CPC ............ *H04L 63/20* (2013.01); *H04L 41/0893* (2013.01); *H04L 41/5003* (2013.01)

(58) Field of Classification Search
CPC ..... H04L 63/08; H04L 63/10; H04L 63/0807; H04L 9/3213; G06F 21/31
See application file for complete search history.

(56) References Cited

U.S. PATENT DOCUMENTS

| 6,078,953 | A  | 6/2000  | Vaid et al.   |           |
|-----------|----|---------|---------------|-----------|
| 6,088,451 | A  | 7/2000  | He et al.     |           |
| 6,665,264 | B1 | 12/2003 | Davison et al.|           |
| 6,760,306 | B1 | 7/2004  | Pan et al.    |           |
| 7,664,022 | B2 | 2/2010  | Hu            |           |
| 8,225,385 | B2 * | 7/2012 | Chow ...................... | H04L 63/08 |
|           |    |         |               | 713/168   |
| 2002/0019873 | A1 | 2/2002 | Goldszmidt et al. |       |
| 2002/0112155 | A1 | 8/2002 | Martherus et al. |        |
| 2003/0117954 | A1 | 6/2003 | De Neve et al. |          |
| 2003/0120778 | A1 | 6/2003 | Chaboud et al. |          |

(Continued)

OTHER PUBLICATIONS

U.S. Appl. No. 11/513,100, Notice of Publication, dated Mar. 6, 2008, 1 page.

(Continued)

*Primary Examiner* — Jung Park
(74) *Attorney, Agent, or Firm* — Baker & Hostetler LLP

(57) ABSTRACT

A policy-based management mechanism is provided, whereby the mechanism provides for at least the controlling of access to network resources, the integration of different frameworks into a common open standard, and modular components for assembling integrated date and voice services. The mechanism accomplishes this by using an access management component that checks for access credentials, a service management component that identifies which resources are available to a requestor of resources, and a resource management component that manages the requested resources. In one exemplary implementation, a fourth component, the policy management component links the first three components such that a resource request gains access to resources based on policy decisions determined by the fourth component for the first three components.

18 Claims, 8 Drawing Sheets

(56) References Cited

U.S. PATENT DOCUMENTS

| | | | |
|---|---|---|---|
| 2003/0177246 A1 | 9/2003 | Goodman et al. | |
| 2004/0210771 A1 | 10/2004 | Wood et al. | |
| 2005/0055292 A1 | 3/2005 | Kissner et al. | |
| 2005/0283615 A1 | 12/2005 | Chakravarthi et al. | |
| 2007/0240203 A1 | 10/2007 | Beck | |
| 2014/0337936 A1* | 11/2014 | Beck | G06F 19/322 726/4 |

OTHER PUBLICATIONS

U.S. Appl. No. 11/513,100, Issue Notification, dated Jan. 27, 2010, 1 page.

U.S. Appl. No. 11/513,100, Non-Final Rejection, dated Apr. 8, 2009, 17 pages.

U.S. Appl. No. 11/513,100, Notice of Allowance, dated Nov. 17, 2009, 9 pages.

* cited by examiner

POLICY-BASED SERVICE MANAGEMENT SYSTEM

CROSS REFERENCE TO RELATED APPLICATIONS

This application is a continuation of, and claims priority to, U.S. patent application Ser. No. 12/649,956 filed Dec. 30, 2009, issued Feb. 25, 2014 as U.S. Pat. No. 8,659,997. U.S. patent application Ser. No. 12/649,956 is a continuation of U.S. patent application Ser. No. 11/513,100 filed Aug. 29, 2006. U.S. patent application Ser. No. 11/513,100 issued on Feb. 16, 2010 with U.S. Pat. No. 7,664,002. U.S. patent application Ser. No. 12/649,956 is incorporated herein by reference in its entirety. U.S. patent application Ser. No. 11/513,100 is incorporated herein by reference in its entirety. U.S. patent Ser. No. 7,664,002 is incorporated herein by reference in its entirety. U.S. Pat. No. 8,659,997 is incorporated herein by reference in its entirety.

BACKGROUND

The evolution towards internet protocol (IP) based service networks may entail the use of modular and horizontal service frameworks. Although currently there are several different systems and frameworks being employed, such as PARLAY, PARLAY X, and Web Services, there is no working system that meets such requirements as: the providing of controlled access for network resources; the integration of different frameworks into a common open standard framework; and, the providing of modular components for assembling integrated data and voice services. Thus, it would be advantageous to provide a policy management system as an independent service enabler to provide centralized controlled access to resources and bring such frameworks together in a uniform way that would allow entities, such as companies, to manage services and resources in a consistent and cohesive manner.

SUMMARY

A policy-based management mechanism is disclosed. This mechanism may have a first component configured to manage access requests for a resource(s) made by a requestor. It may also have a second component configured for managing the request, so that the second component identifies if the request is of a type that is assigned to the requestor. Finally, it may have a third component configured for managing the resource the requestor is requesting during a service session.

In one implementation, for example, a fourth component, the policy management component, links the first three components by providing policy decisions that determine how the three components behave. Thus, a request for resources may have to pass all three components which may act like three gates before access to the resources is granted. By centralizing decision making based on policies, the mechanism provides controlled access for network resources. However, additionally, it provides for the integration of different frameworks into a common, open, standard and centralized framework.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Figure 1:
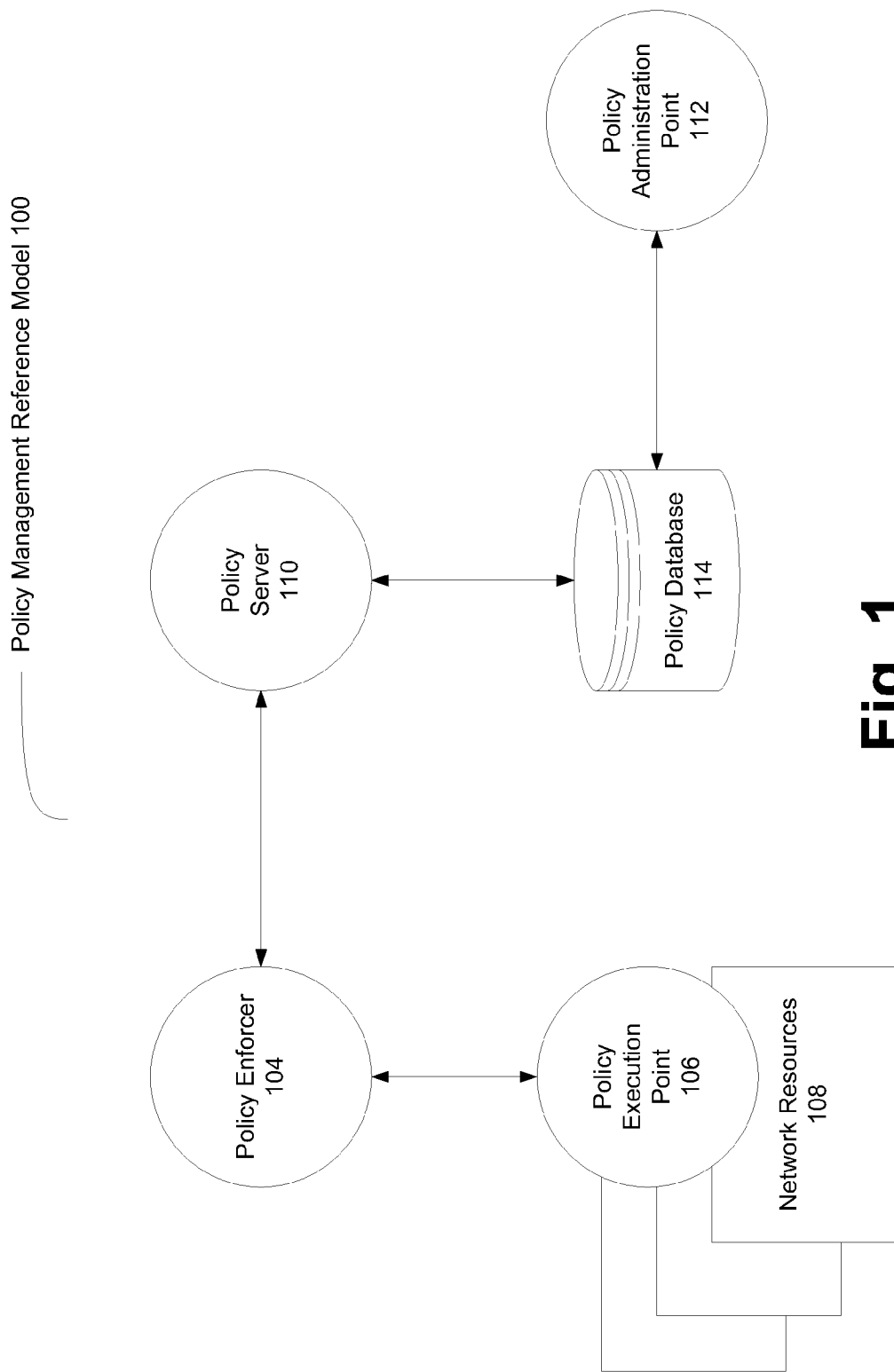
FIG. 1 illustrates a policy management reference model.

Various aspects of the subject matter illustrated in the figures are described in more detail directly below. First, general and exemplary (and hence non-limiting) aspects of policy-based service management are considered, followed by a brief discussion of suitable computing environments for the policy-based service management.

Aspects of Policy-Based Service Management

Policy management is gaining importance in how services and resources are managed. Policy management can refer to any management paradigm that uses policies to manage resources, processes, and underlying systems. A policy, in turn, can be any set of rules and instructions that determine a network's operation. For example, policy rules can be implemented as conditional statements such as: if a set of policy conditions occurs, then a set of policy actions follows. Policies can be reflected at different levels of any given network. For instance, there can be service policies, access policies, resource allocation policies, quality of service policy, and so on.

As networks evolve towards internet protocol (IP) based service networks, modular, horizontal service frameworks become important. As mentioned above, the goals of service frameworks can include any of the following: (1) to provide controlled access for network resources; (2) to integrate different frameworks into a common open standard framework; and (3) to provide modular components (enablers) for assembling integrated data and voice services, and so on. Policy management systems can act as independent service enablers to allow controlled access to resources and to bring various frameworks together in a uniform way that will allow companies to manage services and resources in a consistent and cohesive manner. Thus, a policy-enabled service (or application) can be a service whose functional behavior is determined wholly or partially by policies. Furthermore, standards-based policy management concepts can be carried out within mechanisms such as a distributed management task force (DMTF) or the internet engineering task force (IETF). These mechanisms form the basis of many policy management system architectures.

The benefits of policy management frameworks are clear. Companies can create policies for prioritizing traffic from different users and applications; they can consolidate and synchronize access control lists and related policy information to promote a consistent security policy; they can consolidate a user's services preferences to reduce undesirable service interactions; they can provide for converged services with parent companies and third party services providers, and so on. These are merely exemplary benefits, and those skilled in the art can readily recognize many more accompanying benefits.

In a typical architecture, a network node may be the site of a policy enforcement point, otherwise referred to as a policy enforcer. A node may be any physical machine; a point may be any logical construct anywhere on a network. A policy enforcer is the place where policy decisions are enforced. Multiple such policy enforcers can exist. By contrast, a policy decision point, otherwise also referred to as a policy server, is the component making a decision, and in one aspect of the presently disclosed subject matter, it is centralized logically (if not physically—but can it also be centralized even physically).

A policy server is able to access or dip into a policy database in order to obtain policy information. Based on this information, a policy decision can be made and then enforced by the policy enforcer.

Incidentally, the policy enforcer may also communicate with a local policy servers in order to provide distributed policy decision making. Although in some aspects, a centralized decision making server may be advantageous, in other aspects a distributed decision making scheme allows nodes to have not only enforcement servers but intelligent policy servers. The costs and benefits of a centralized versus a distributed policy decision making scheme will depend on a myriad of considerations which the person of skill in the art will appreciate.

FIG. 1 illustrates a policy management reference model 100. In this model 100, a policy-enabled application (or it could likewise be a service), which is just an application whose functional behavior is determined wholly or partially by policies, may reside on the same node as a policy enforcer 104. The policy enforcer 104 may be distinct from a policy execution point 106 (although in some cases it may be merged with it—in the sense that both reside on the same physical machine). The policy execution point 106 may also have network resources 108, such as memory, processing power, bandwidth, and the like, in order to carry out policy executions. It is worthy to note that the separation of components, such as the policy enforcer 104 and the policy execution point 106, forces structured and more reliable use of any policy engine employing such components and, moreover, a deliberate input/output perspective on decision requests.

The policy enforcer 104 carries out policy decisions made by the policy server 110. The policy server 110 makes its decisions based on various resources, such as a policy database 114. Those skilled in the art would readily appreciate the types of resources that could be used in making decisions, including other data sources distinct from the databases 114. Once a decision is made regarding a policy by the policy server 110, that decision may be stored in a policy repository for logging and polling purposes. Interestingly, a policy administration point 112, which may be a server, may provide a user or an administrator with the opportunity to provide input regarding the policies. In addition to allowing input, policies may also be output for reporting or other purposes.

Specifically, policies may be sets of rules and instructions that determine a network's operation, and the policy server 110 makes a decision based on such policies. For example, a policy may be implemented, where a rule limits all applications for a given provider to an aggregate threshold: for instance, a rule can stipulate that all applications from Company A cannot collectively exceed 10 tps or 5000 bps; on the other hand, per the rule, all applications from Company B cannot collectively exceed 15 tps or 6000 bps.

Figure 2:
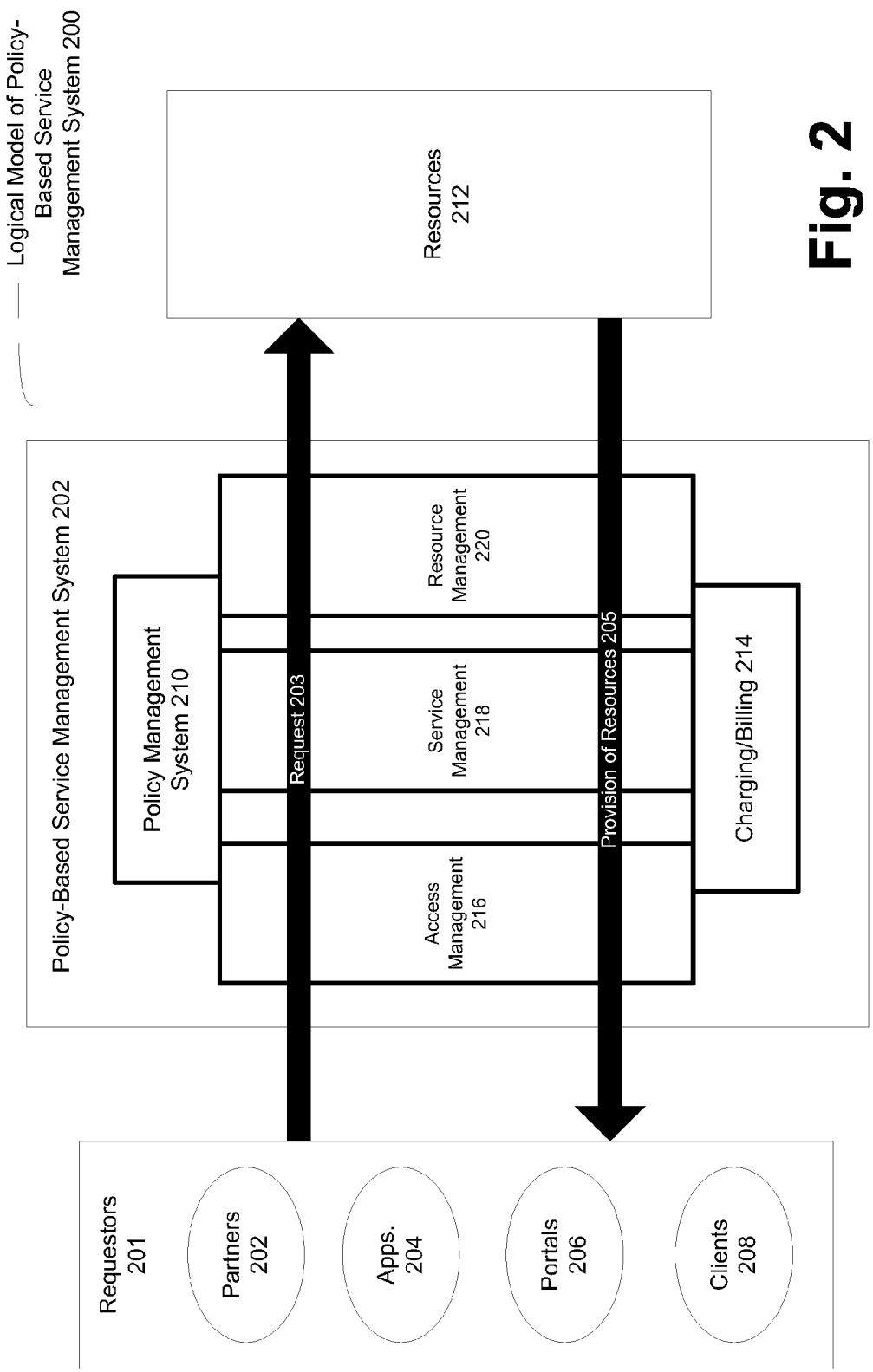
FIG. 2 illustrates a policy-based service management system.

FIG. 2 illustrates a logical model of the policy-based service management system 200. With reference to FIG. 2, the flow of services requests 203 from requestors 201, such as partners 202, applications 204, portals 206, or clients 408, may go through a three stage (216, 218, and 220) gated process before any requests 203 can be granted. First, the services requestors 201 can be authenticated and their credentials can be issued in the access management component 216 of the policy-based service management system 202. Secondly, based on a user's subscription record, for example, and the service policies, the service requests 203 can be authorized by the services management component 218. Finally, the requested resources 212 can be made available and properly provisioned 205 and reserved for a guaranteed level of quality-of-service via the resource management 220 component.

Put in other words, the access management component 216 may ask who a requestor is; the service management component 218 may determines what resources 212 are available to the requestor (either based on resource availability, or whichever resources the requestor signed-up for, or a combination of the two); and, the resource management component 220 may manage and control the resources 212 such that the requestor is accorded the proper resources.

For example, it could be the case that when resources 212 are scarce, even though a requestor 201 may be accorded some amount of resources 212, that requestor's ability to use the resources will be reduced to accommodate other requestors or to accommodate system limitations. The resource management component 220 does what its name suggests, namely, manages resources accorded to requestors 201. It does so based on various policies that may be stored in databases. For example, back in FIG. 1, such a database 114 was disclosed.

As is shown, all three components or modules 216, 218, and 220 are linked by a common policy management system 210. The policy management system 210 ensures a smooth interoperation between these three components or gates. In one aspect of the present disclosure, the policy management system 210 corresponds to that system disclosed in FIG. 1, comprising of at least a policy server 110 that is able to dip into a policy retaining database 114, wherein the database 114 allows a policy administration point 112 to change, modify, add, delete, etc., the different policies.

These three logical stages, 216, 218, and 220, are one example of the proposed service architecture. The policy management system 210 may, for instance, effectively manage telecom services, such as voice and data. The establishment of such an independent, centralized policy management system 210, allows for linking between network consumers 201 and network resources 212 using policy-based technology. And, it allows for control and management of services and applications in a unified and centralized manner. Additionally, it allows, as mentioned above, for connection to different frameworks (such as OSA/Parlay, Web Services, and others) to help in deployment of end-to-end policy-based service solutions. Furthermore, the centralized policy management system 210 is also more cost effective and easier to manage—for example in allowing dynamic policy control that is resource and service aware.

Lastly, in FIG. 2, there's a charging and/or billing component or module 214. This module ensures that whatever resources are provisioned 205 from the resource 212 to the requestors 201, that they get properly handled. For example, one request may be chargeable, such as a request for a broadband internet service or a cellular phone service. Other services, such as text messaging, may be noted by the billing component 214 and yet a charge may not be incurred to the requestor 201. The charging and/or billing policies are likewise subject to being set by an administrator of the policy-based service management system 202.

Figure 3:
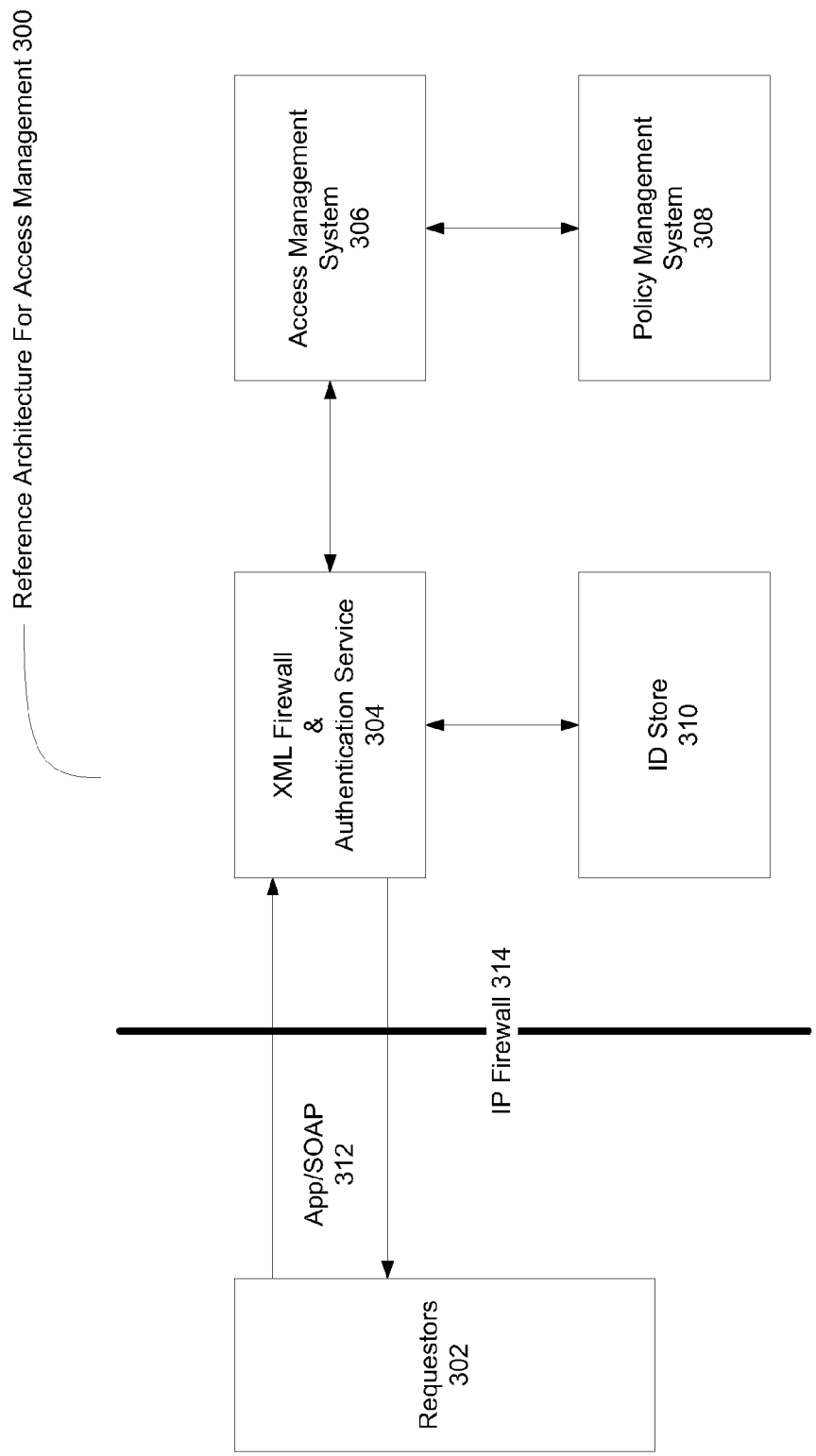
FIG. 3 illustrates a reference architecture for access management.

Shifting the focus to selected individual components discussed with reference to FIG. 2, FIG. 3 illustrates a reference architecture for access management 300, which is the first of three components or gates discussed with reference to FIG. 2, namely, component 216. When a request is first made by any requestor 302, the request may need to first pass through an IP Firewall 314. This is a typical internet protocol firewall readily appreciated by any skilled person in the art. If the request does get past the firewall 314, a second application firewall may appear 304. In addition to the application firewall 304 (in contrast to a system wide IP Firewall 314), the request is authenticated by an authentication service 304 (depicted here together with the application firewall, but these components could be arranged separately, depending on the need of anyone implementing this technology).

In order to make the authentication, the authentication service 304 dips into an ID store 310. The ID Store 310 may contain a host of various information. For example, it may contain passwords and user names that should be matched up with those that the requestor 302 is providing. Of course, other information can also be stored in the ID Store 310, such as digital ID certificates (for instance, based on public and private key encryption). Such digital ID certificates can be embedded in a service profile of a user, thereby easily identifying that user.

The authentication service 304 can also communicate with the access management system 306, where this system 306 allows the identification and authentication of requestors 302 even though such requestors 302 may be attempting to obtain services other than that originally requested at 304. For example, a user at first requesting cell phone services may then additionally request web browsing services. In order to prevent such a user from logging in twice (or multiple times for each service), this aspect of the disclosure can manage two or more access request from a user making such requests from various applications without having to authenticate the user each time—unless such per service authentication is desired, in which case the system can 306 be configured accordingly.

Next, the access management system 306 can communicate with the policy management system 308. This latter system 308 manages different polices upon which access management may be based. For example, one policy might be that users under the age of seventeen should not be able to access R-rated web sites. Other numerous polices like can be developed. It also goes without saying that these policy management rules for accessing resources are modifiable in just about any way by a typical administrator of the access management system 300.

Figure 4:
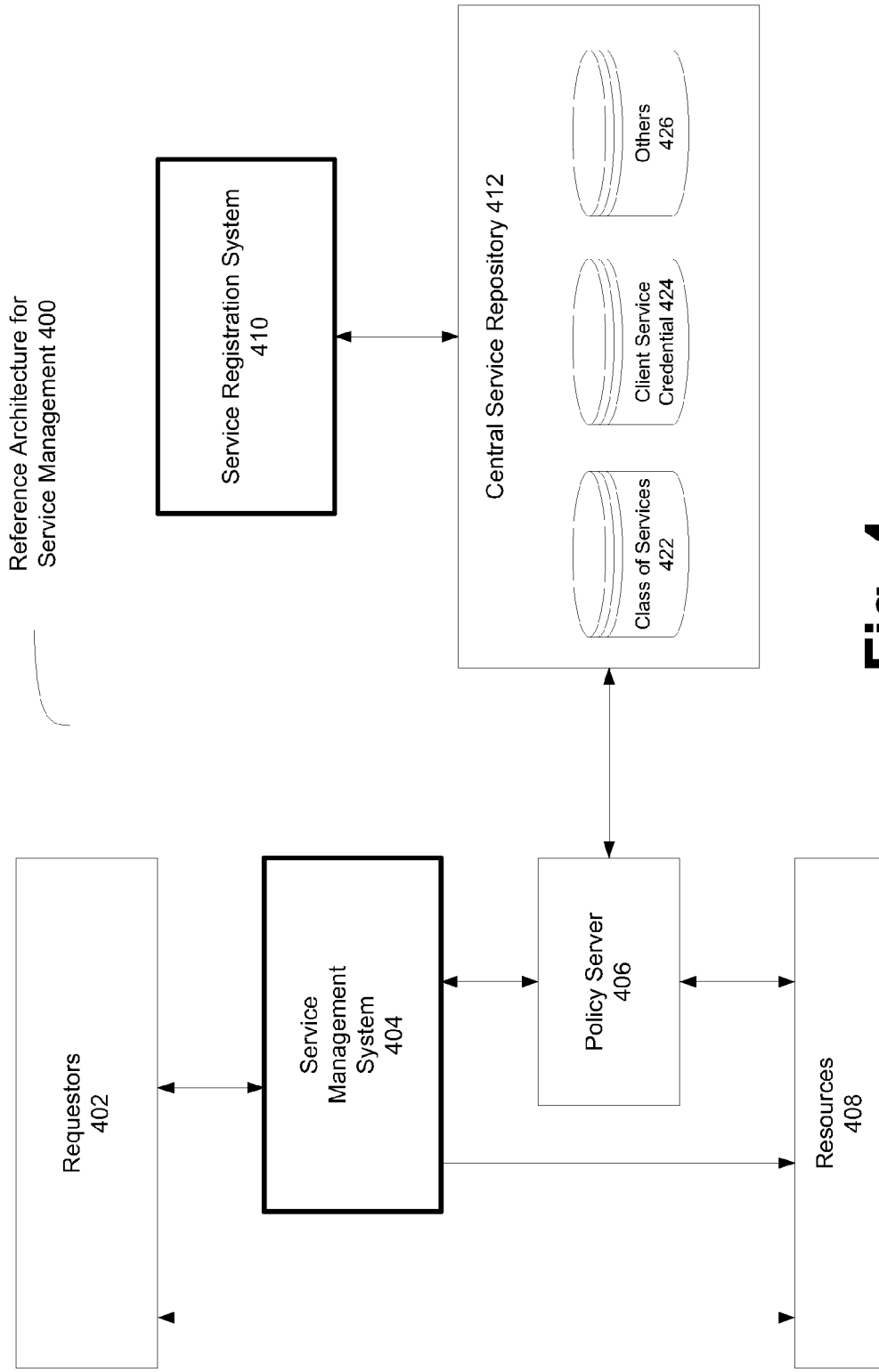
FIG. 4 illustrates reference architecture for service management.

FIG. 4 illustrates reference architecture for service management 400, which corresponds to the second component or gate discussed with reference to FIG. 2, namely, the service management gate 218. According to FIG. 4, requestors 402 interact with the service management system 404 after obtaining access through the first gate. The system 404 communicates with a policy server 406 (which may be part of the system 404 or an auxiliary part), and the policy server 406, in turn, determines from the central data repository 412 if a resource that a requestor 402 signed-up for or has access to is available to the requestor 402—and the extent to which it may be available. Moreover, there is a service registration system 410 allowing, for example, an administrator to change service management policies for via an interface or some other interaction device.

The policy server 406 is a mechanism that can answer to the system 404 whether certain resources 408 are available. Thus, in its simplest form, the server 408 can either say, 'yes', resources X is available, or, 'no', resource Y is not available. Of course the policy server 406 can be a lot more complicated and sophisticated, thus able to make intelligent decisions. In one aspect of the disclosure, the policy server 406 communicates with central service repository 412 via a Diameter protocol in order to access policies in order to see if a certain resource can be obtained.

Figure 5:
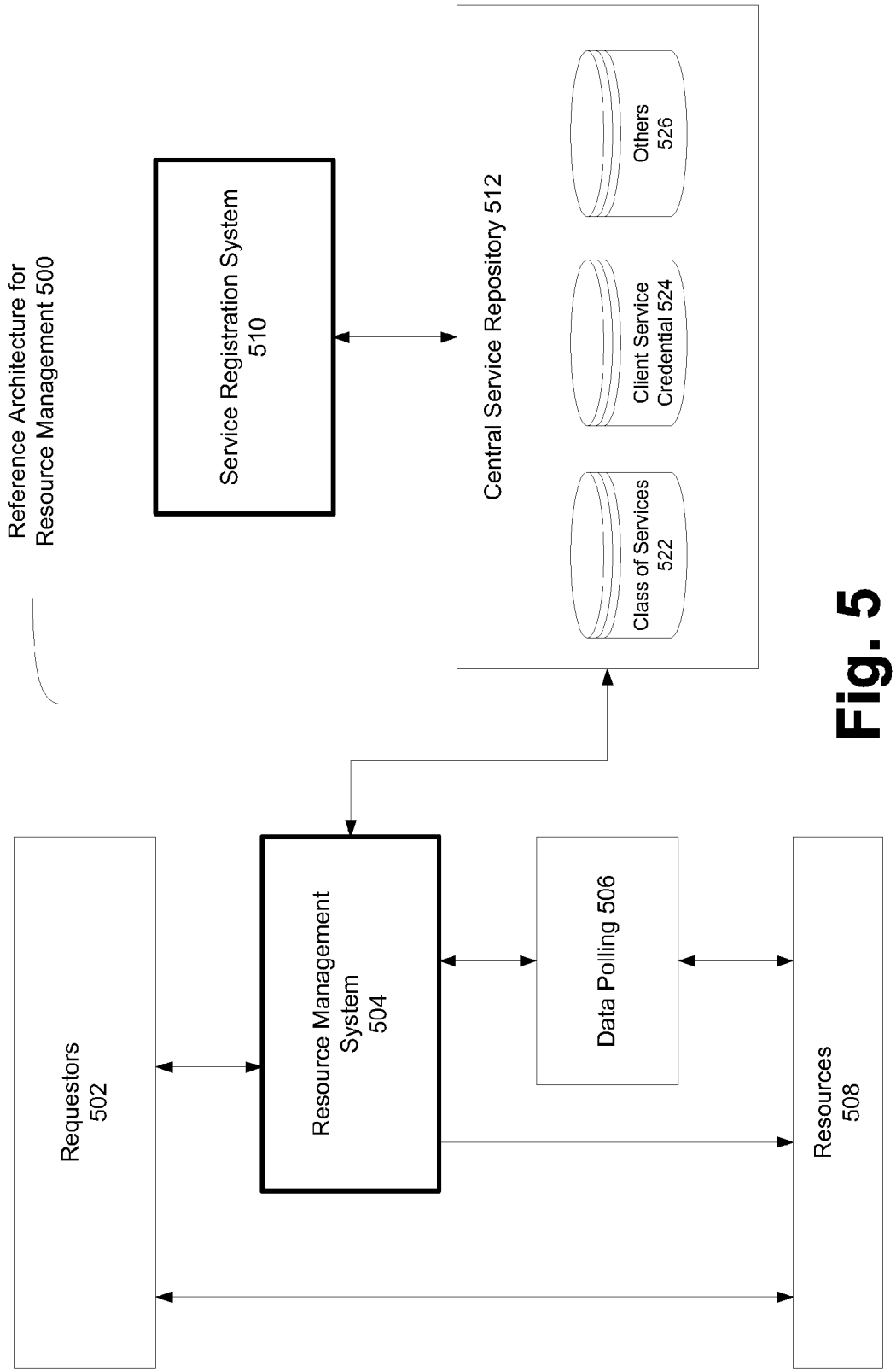
FIG. 5 illustrates reference architecture for resource management.

Next, FIG. 5 illustrates a reference architecture for resource management 500. In other words, FIG. 5 illustrates in more detail the third component or gate discussed in FIG. 2. Requestors 502 makes requests to the resource management system 504, which in turn keeps polling the resources 508 via a data polling module 506. The polling module 506 keeps an eye on the resources 508, so to speak, watching and recording how they are being used. If, for example, the resources 508 are being misused by a requestor 502, or they are becoming scarce for some reason, the resource management system 504 can act accordingly to set resource distribution among various requestors 502 according to the policies stored in the central repository 512. As was true of the previous two gates discussed above, the central service repository 512 can be set by a service registration system 510. Exemplary contents of the central service repository 512 are shown: class of services 522, client service credentials 524, and other resources/services 526. Those of skill in the art will readily appreciate the different kinds of contents that could be stored in the central repository 512.

Figure 6:
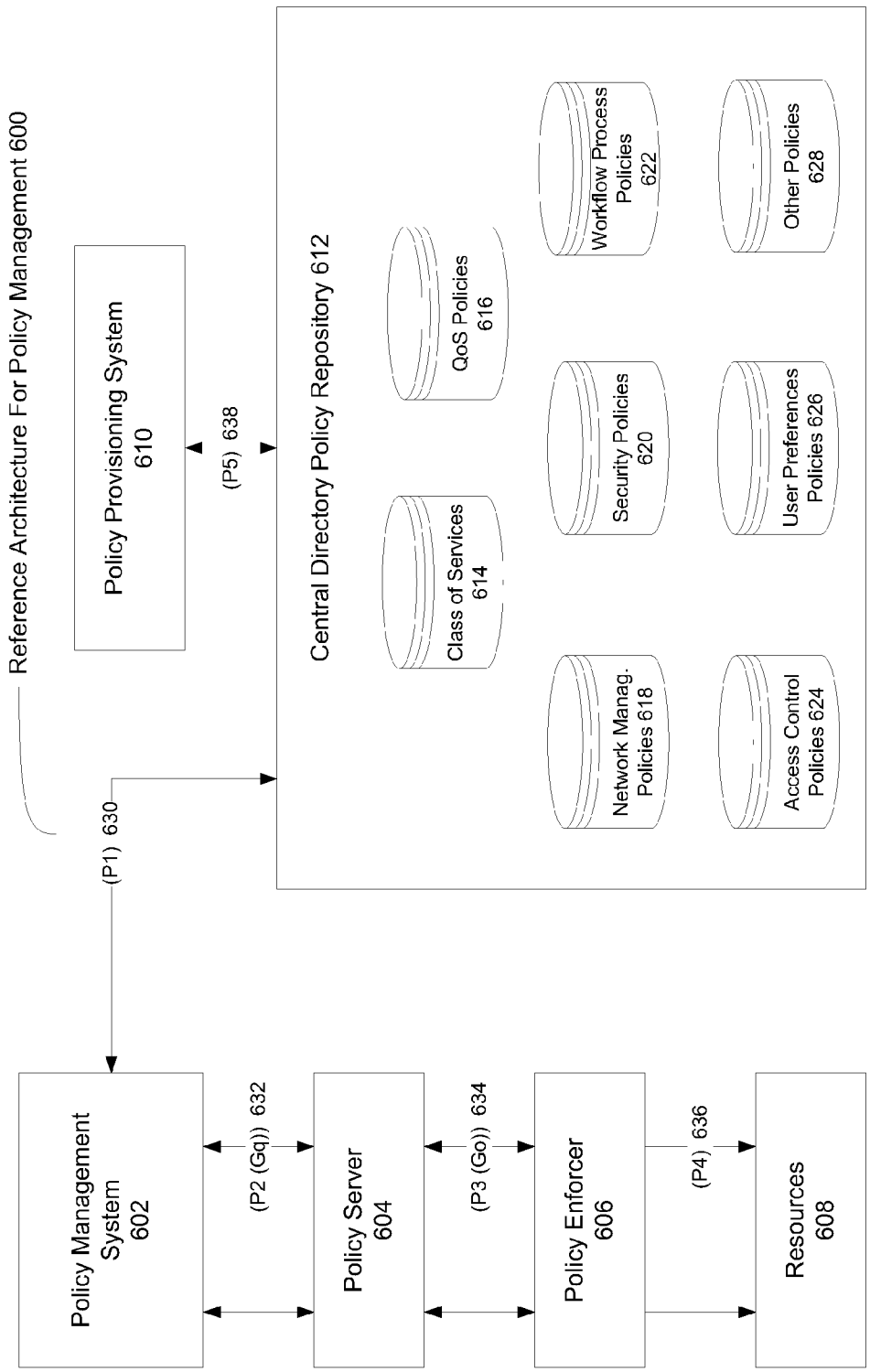
FIG. 6; illustrates a reference architecture for policy management

FIG. 6 illustrates a reference architecture for policy management 600, which corresponds to the policy management system/component 410 in FIG. 4. The policy management system 602 may manage policies by accessing a central directory policy repository 612. Such a repository 612 may store various types of policies relating to policy management. Thus, for example, policy management can be understood to be an umbrella term that includes quality of service policies 616, network management polices 618, security polices 620, workflow process policies 622, access control policies 624, user preferences polices 626, and so on—the list is almost endless.

Once the appropriate policy is obtained by the policy management system 602 from the central directory policy repository 612, a policy decision can be made by a policy server 604—which is discussed in more detail above, especially with reference to FIGS. 1 and 2. Then, once a decision is made based on some policy, the policy enforcer 606 actually enforces or executes the policy that was selected. Upon execution of a policy, the resources 608 are either provided to a requester or they are not provided—or the type and amount of resources are provided, along with other conditions that may be based on various policies.

Additionally, a policy provisioning system 610 is provided that allows modifications, additions, deletions, etc. of policies that reside in the central directory policy repository 612. Various levels of authorization may be employed to set these policies in the repository 612. For example, a manager might have level 1 authority to set policies for his workers, and the manager's manger might in turn have level 2 authority to set polices, and so on.

It is worthy to note that a standard policy management system, as that discussed with reference to FIGS. 3, 4, 5, 6, and 7 can be based on an IETF PM model or a 3GPP model.

The policy decision function, discussed above, can be 3GPP standardized. Such a policy management system can be useful for convergence of services; integrated, multimedia, and multi-session services; service control and management; security; subscriber management; differential billing, and so on.

Figure 7:
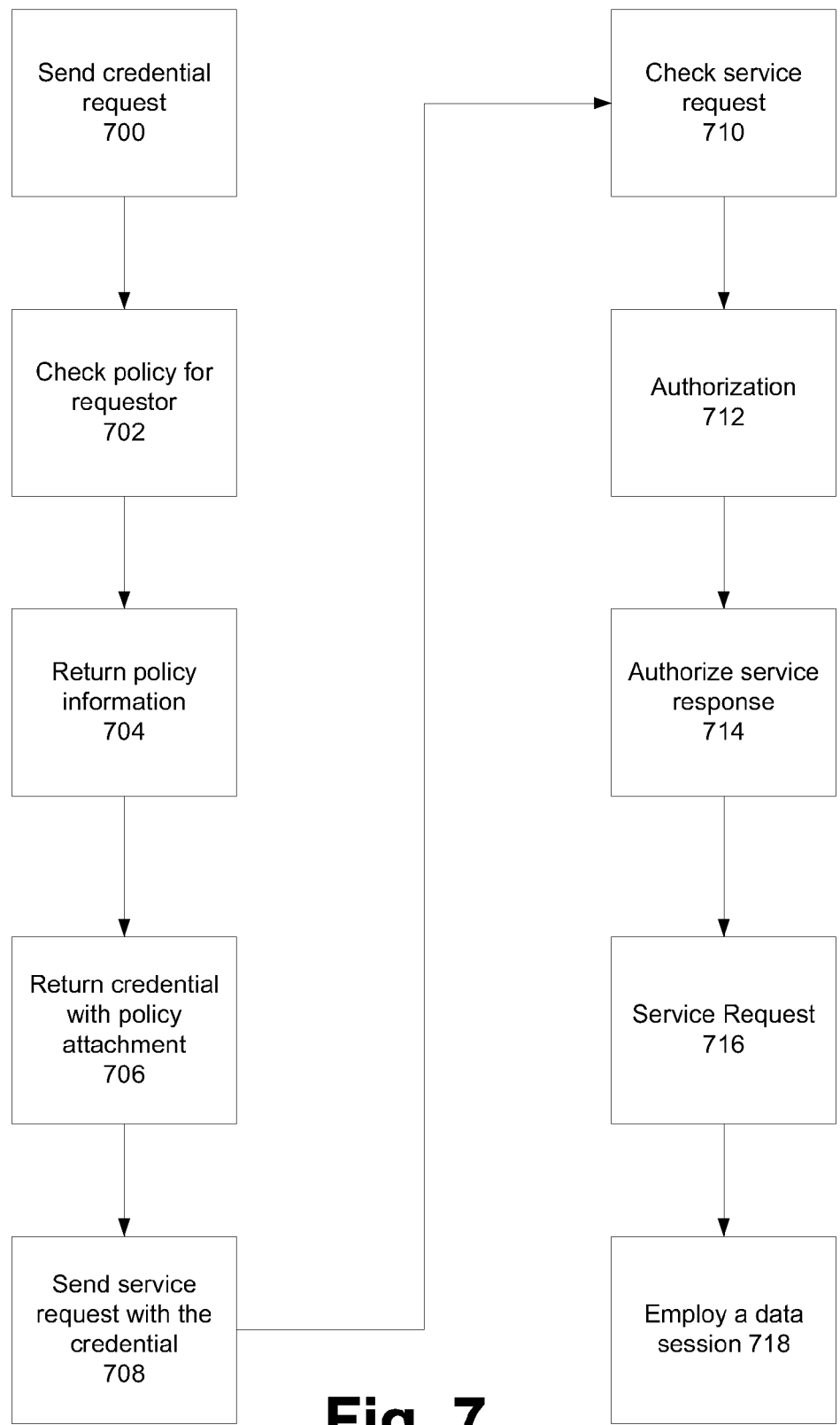
FIG. 7 illustrates a service flow chart for a policy-based service management system.

FIG. 7 illustrates a service flow chart for a policy-based management system. In other words, it describes a general flow of the aspects discussed above, especially those in FIGS. 2, 3, 4, 5, and 6. The flow chart starts with a service request 700 and ends with its fulfillment of access to resources 718. At block 700, a requestor sends a credential request to a customer central credential authority. Then, the central credential authority, in turn, processes this request and calls a policy server. At block 702, the policy server checks the policy for the particular requestor in question.

Once this happens, at block 704, the policy server returns the relevant policy information back to the central credential authority. The central credential authority, in turn, at block 706, returns the credential back to the requestor along with any policy attachments. Once this is done, at block 708, a service request can be sent (along with the credential) to a policy enforcer.

When the policy enforcer receives the request, at block 710, it can process the request and send it to the policy server. Once at the policy server, the request is further processed and, at block 712, authorization is given by the policy server back to the policy enforcer. The policy enforcer, then, at block 814, can authorize a service response.

Thus, the requestor receives the service response, and following this, at block 716, the policy enforcer sends a service request to the resources content. Finally, at block 718, a data session is employed such that a requestor has access to the resources requested.

Figure 8:
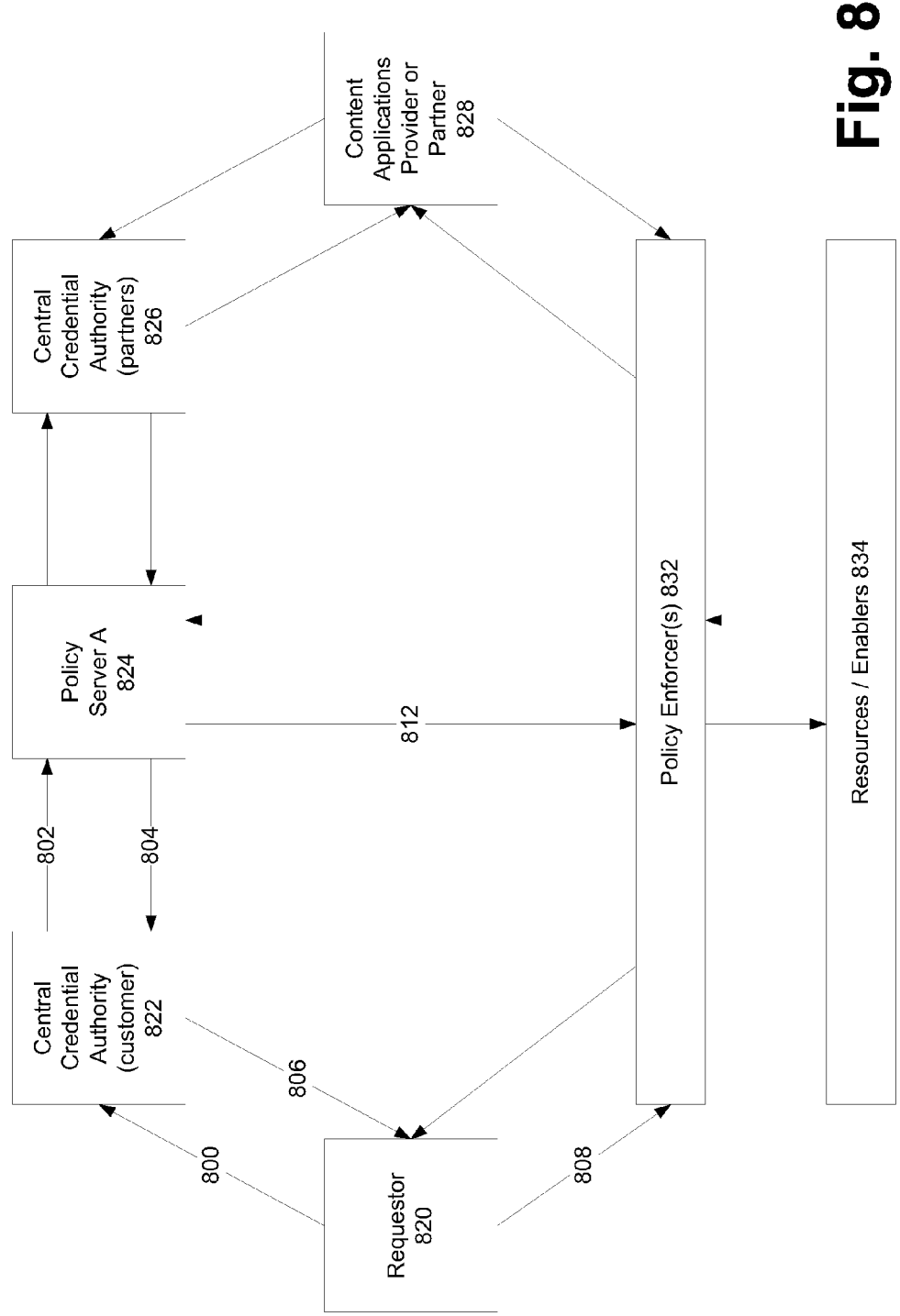
FIG. 8 illustrates a service flow diagram for a policy-based service management system.

Another way to understand the process described with reference to FIG. 7 is to look at it from a system point of view illustrated in FIG. 8. Thus, FIG. 8 depicts the policy-based service management system flow diagram. First, a requestor 820 sends a credential request 800 to a central credential authority 822. Incidentally, content applications providers or partners 828 can also send such requests to a central credential authority specified for such providers and/or partners 826. The central credential authority 822 forwards that request to a policy server 824 that then checks the policy for that request 802.

The policy server 824 returns the relevant information regarding the policy 804 back to the central credential authority 822, and the authority 822 returns the credential information along with any relevant policy attachments 806 back to the requestor 820. Once this is accomplished, the requestor 820 can send a service request with the credential information 808 to the policy enforcer 832.

The policy enforcer 832 (there may be more than one such enforcer, distributed all over a given network) checks the service request with the policy server 824. In other words, the policy server 824 makes a policy decision and the policy enforcer(s) 832 actually carry it out.

The policy server 824 provides authorization for the request (the policy server 824 may have databases of polices which to choose from). Once authorization 812 is obtained, the requestor 820 receives an authorization response from the policy enforcer. Following this, the original service request is provided with resources 834 and a data session is started.

Lastly, the access checking and service authorization corresponds to the access management and services management described with reference to FIG. 4. Also, resource management may entail a dynamic management of the resources during the aforementioned data session. Thus, the logical depiction of the policy management service, as in FIG. 2, corresponds to the physical implementation of the disclosed subject matter in FIGS. 7 and 8.

Aspects of a Suitable Wireless Network Environment

The policy management technology discussed above can be employed in various computing environments. And, moreover, in software form, the technology can be stored on various media, not just computer readable media bearing computer executable instructions for use in a computing system.

The following discussion are intended to provide a brief general description of a suitable computing environment in connection with which the technology may be implemented. It should be understood, however, that handheld, portable and other computing devices and computing objects of all kinds are contemplated for use in connection with the present technology, i.e., anywhere where that it is desirable to flexibly, or quickly process data in a computing environment. While a general purpose computer is described below, this is but one example, and the present technology may be implemented with a thin client having network/bus interoperability and interaction. Thus, the present technology may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques for downloading algorithmic elements to a coprocessor in accordance with the technology.

Although not required, the technology can be implemented via an operating system, for use by a developer of services for a device or object, and/or included within application software that operates in connection with the methods for coordinating wireless traffic in accordance with the technology. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the herein described technology may be practiced with other computer system configurations and protocols. Other well known computing systems, environments, and/or configurations that may be suitable for use with the technology include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers, and of course the above discussed mobile devices. The technology may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes, as described above.

A computer associated with the presently disclosed subject matter may operate in a networked or distributed environment using logical connections to one or more remote computers. The remote computers may be a personal computer, a server, a router, a network PC, a peer device or other common network node, and typically includes many or all of the elements described above relative to the computer. The network connections may include a local area network (LAN), a wide area network (WAN), and may also include other networks/buses. Such networking environments are commonplace in homes, offices, enterprise-wide computer networks, intranets and the Internet.

When used in a LAN networking environment, the computer is connected to the LAN through a network interface or adapter. When used in a WAN networking environment, the computer typically includes a modem or other means for establishing communications over the WAN, such as the Internet. Data communications device, such as a modem, which may be internal or external, may be connected to the system bus via the user input interface, or other appropriate mechanism. In a networked environment, program modules depicted relative to the computer, or portions thereof, may be stored in the remote memory storage device.

While the present disclosure has been described in connection with the preferred aspects, as illustrated in the various figures, it is understood that other similar aspects may be used or modifications and additions may be made to the described aspects for performing the same function of the present disclosure without deviating there from. For example, in various aspects of the disclosure, policy management technology was discussed. However, other equivalent mechanisms to these described aspects are also contemplated by the teachings herein. Therefore, the present disclosure should not be limited to any single aspect, but rather construed in breadth and scope in accordance with the appended claims.

In summary, the system described is a policy-based management system. That system comprises a number components. In particular, the system comprises a first component configured for managing an access request for a resource made by a requestor. The system also comprises a second component configured for managing the request, wherein the second component identifies if the request is of a type that is assigned to the requestor. Additionally, the system comprises a third component configured for managing the resource the requestor is requesting during a session. The system also comprises a fourth component that links the first, second, and third components such that the managing of all three components is based on at least one policy consideration.

What is claimed:

1. A system comprising:
  a processor; and
  memory coupled to the processor, the memory comprising executable instructions that when executed by the processor cause the processor to effectuate operations comprising:
    issuing a credential comprising a description of a resource allocation policy pertaining to a resource;
    performing a first query to a policy repository comprising a plurality of resource allocation policies;
    authenticating access to the resource based on a result of the first query;
    performing a second query to the policy repository;
    authorizing the credential based on a result of the second query;
    granting a request to utilize the resource based on the result of the second query;
    determining, based on monitored utilization of the resource, whether the utilization of the resource is in accordance with the request and in accordance with the resource allocation policy; and
    managing the utilization of the resource in accordance with the determination.

2. The system of claim 1, wherein the resource allocation policy governs an amount of the resource that can be utilized in accordance with the request to utilize the resource.

3. The system of claim 1, wherein the resource policy governs how the resource can be utilized by a requestor requesting to utilize the resource.

4. The system of claim 1, wherein the policy repository comprises the plurality of policies stored in a centralized policy database.

5. The system of claim 1, wherein managing the utilization of the resource comprises dynamic management of the resource during a data session.

6. The system of claim 1, the operations further comprising recording how the resource is being utilized.

7. A method comprising:
  issuing a credential comprising a description of a resource allocation policy pertaining to a resource;
  performing a first query to a policy repository comprising a plurality of resource allocation policies;
  authenticating access to the resource based on a result of the first query;
  performing a second query to the policy repository;
  authorizing the credential based on a result of the second query;
  granting a request to utilize the resource based on the result of the second query;
  determining, based on monitored utilization of the resource, whether the utilization of the resource is in accordance with the request and in accordance with the resource allocation policy; and
  managing the utilization of the resource in accordance with the determination.

8. The method of claim 7, wherein the resource allocation policy governs an amount of the resource that can be utilized in accordance with the request.

9. The method of claim 7, wherein the policy repository comprises the plurality of policies stored in a centralized policy database.

10. The method of claim 7, wherein the resource policy governs allowable utilization of the resource by a requestor requesting to utilize the resource.

11. The method of claim 7, wherein managing the utilization of the resource comprises dynamic management of the resource during a data session.

12. The method of claim 7, further comprising recording information pertaining to the utilization of the resource.

13. A computer readable storage medium that is not a propagating signal, the computer-readable storage medium comprising executable instructions that, when executed by a processor, cause the processor to effectuate operations comprising:
  issuing a credential comprising a description of a resource allocation policy pertaining to a resource;
  performing a first query to a policy repository comprising a plurality of resource allocation policies;
  authenticating access to the resource based on a result of the first query;
  performing a second query to the policy repository;
  authorizing the credential based on a result of the second query;
  granting a request to utilize the resource based on the result of the second query;

determining, based on monitored utilization of the resource, whether the utilization of the resource is in accordance with the request and in accordance with the resource allocation policy; and managing the utilization of the resource in accordance with the determination.

14. The computer readable storage medium of claim 13, wherein the resource allocation policy governs an amount of the resource that can be utilized in accordance with the request.

15. The computer readable storage medium of claim 13, wherein the policy repository comprises the plurality of policies stored in a centralized policy database.

16. The computer readable storage medium of claim 13, wherein managing the utilization of the resource comprises dynamic management of the resource during a data session.

17. The computer readable storage medium of claim 13, the operations further comprising recording information pertaining to the utilization of the resource.

18. The computer-readable storage medium of claim 13, wherein the resource policy governs allowable utilization of the resource by a requestor requesting to utilize the resource.

\* \* \* \* \*